(No Model.)
G. W. LE COMPTE.
BRIDLE BIT.
No. 582,535. Patented May 11, 1897.
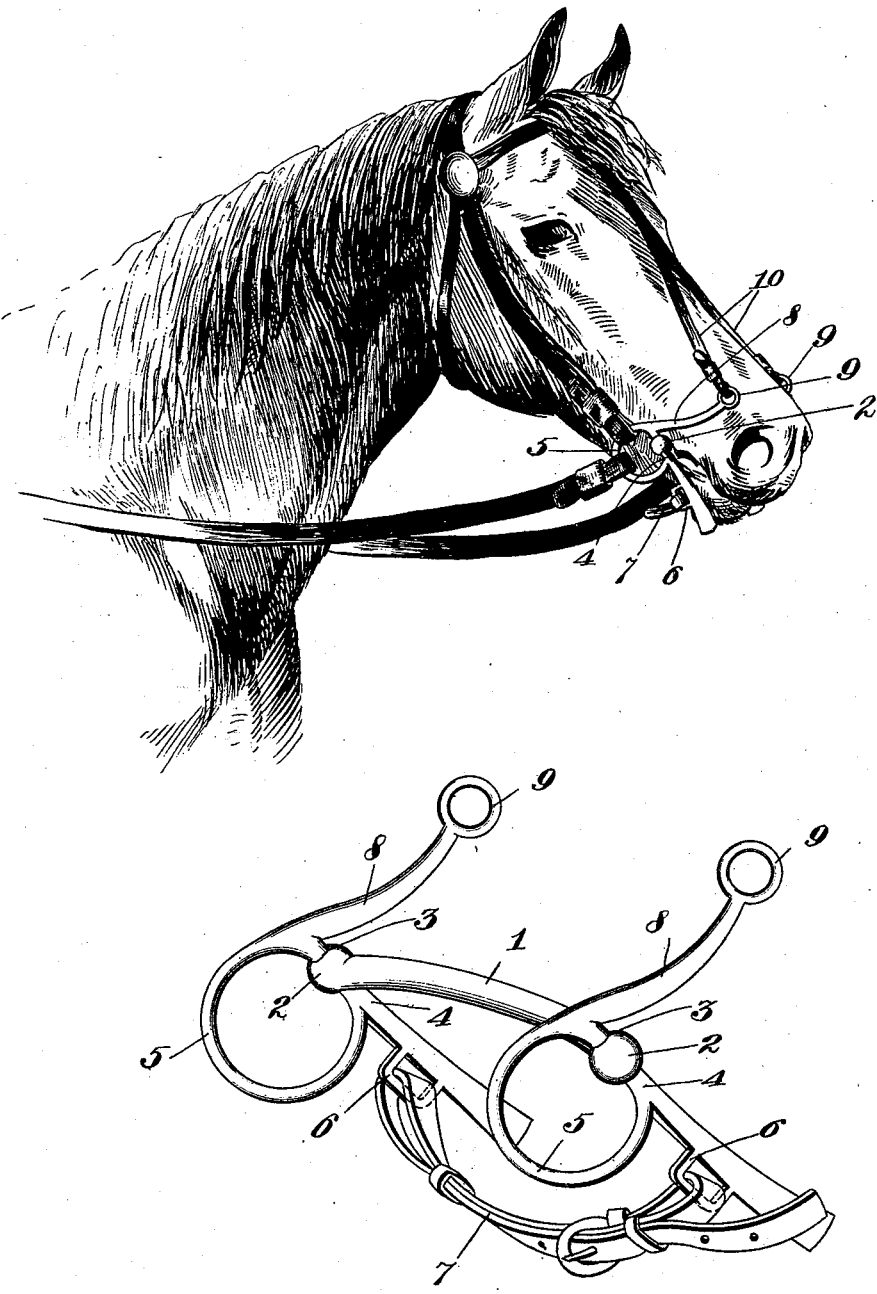
Witnesses.
Inventor.
George W. Le Compte,
By Edward S. Duvall Jr.
his Atty

UNITED STATES PATENT OFFICE.

GEORGE W. LE COMPTE, OF BALTIMORE, MARYLAND, ASSIGNOR OF ONE-HALF TO OSCAR WIENER, OF NEWARK, NEW JERSEY.

BRIDLE-BIT.

SPECIFICATION forming part of Letters Patent No. 582,535, dated May 11, 1897.

Application filed September 25, 1896. Serial No. 606,998. (No model.)

*To all whom it may concern:*

Be it known that I, GEORGE W. LE COMPTE, a citizen of the United States, residing at Baltimore, in the State of Maryland, have invented certain new and useful Improvements in Bridle-Bits; and I do hereby declare the following to be a full, clear, and exact description of the invention, such as will enable others skilled in the art to which it appertains to make and use the same.

My invention relates to improvements in bridle-bits and may be employed in conjunction with either the stiff bit or snaffle variety.

The objects of the invention are to provide a bit which will at all times keep the nose of the horse well out and the mouth closed, thus insuring a graceful carriage of the head, and to prevent what is commonly known as "lugging" and "gagging." The mouthpiece of the bit is kept from slipping through the animal's mouth, and this, in connection with the absence of lugging and gagging, adds to the comfort of the horse.

With these and other objects and advantages in view the invention consists of certain novel features of construction, hereinafter fully described and claimed, and clearly illustrated in the accompanying drawings, in which—

Figure 1 is a perspective view of the bridle-bit in position in the animal's mouth, and Fig. 2 is a perspective view of the same.

In describing my invention like numerals of reference designate like parts throughout the two figures of the drawings.

In constructing the bridle-bit according to my invention the mouthpiece 1 may be as shown, or it may be of the snaffle variety with two bars jointed together in the middle of the mouth. In either case the mouthpiece 1 is provided with enlargements 2 at its ends, which are vertically perforated, as at 3. Within these perforations are swiveled the cheek-pieces 4, provided with the usual rein-rings and adapted to prevent the rings from pulling into the mouth of the animal. These rings, which we will number 5, are formed integral with the cheek-pieces and, besides the reins, also receive the cheek-straps.

The cheek-pieces 4 are constructed midway of their length with rearwardly-extending eyes 6, through which and beneath the under lip of the animal is run a strap 7. This strap is provided with an adjusting-buckle to adapt the strap to varying sizes of lips. The effect of this strap will be to force the mouth forward upon tightening the reins and, in conjunction with another part to be described, to keep the animal's mouth closed.

Extending forwardly from the cheek-pieces 4, above the junction of the mouthpiece 1 with the said cheek-pieces, are the slightly-curved branches 8. These branches are sufficiently long to reach the bridge of the animal's nose, and to receive the V-shaped fore-check the said branches are provided with eyes 9. The ends of the fore-check 10 are secured to these.

It will be seen from this construction and arrangement of parts that the force of the upward pull of the fore-check and the rearward pull of the reins coact to force the mouthpiece upward into the mouth of the animal, thus preventing slipping downward into the teeth of the animal or lugging and gagging, and such coacting of the forces tends to urge the cheek-pieces well forward, the mouthpiece in such instance acting as a pivot upon which to increase the power of the said forces.

With this bit the animal is at all times under complete control of the driver, and while the action of the same is efficient it is neither uncomfortable nor harmful.

I do not desire to limit myself to the precise details of construction herein shown and described, but reserve to myself the right and privilege to alter the same within the bounds of mechanical ingenuity without departing from the spirit of my invention.

Having thus described my invention, what I claim as new, and desire to secure by Letters Patent, is—

1. In a bridle-bit, the combination with cheek-pieces and means for securing said cheek-pieces immovably to an animal's head, of a non-rotatable mouth part, secured to said cheek-pieces and rein-rings in direct connection with the said mouth part.

2. In a bridle-bit, the combination with cheek-pieces and adjustable devices for securing said cheek-pieces immovably to an animal's head, of a non-rotatable mouth part, secured to said cheek-pieces and rein-rings in direct connection with the said mouth part.

3. In a bridle-bit, the combination with cheek-pieces, and chin-band and overdraw connections for securing said cheek-pieces immovably to an animal's head, of a non-rotatable mouth part secured to said cheek-pieces, and rein-rings in direct connection with the said mouth part.

4. In a bridle-bit, the combination with cheek-pieces, comprising upwardly-disposed extensions, designed to be connected with the fore-check or overdraw, and oppositely-disposed extensions, an arched connection between said extensions adapted to fit under the lower jaw of the animal, and rein attachments, arranged to permit only a direct pull on the mouth part; of a mouth part secured to the cheek-pieces, contiguous to the rein attachments, and so connected as to prevent any rotation of the mouth part, relatively to the cheek-pieces, substantially as described.

5. In a bridle-bit, the combination with cheek-pieces, comprising upwardly-disposed extensions, designed to be connected with the fore-check or overdraw, and oppositely-disposed extensions, an arched connection between said extensions, adapted to fit under the lower jaw of the animal, and rein attachments, arranged to permit only a direct pull on the mouth part; of a mouth part, having axial perforations at its extremities, to receive and retain the cheek-pieces, contiguous to the rein attachments, substantially as described.

6. In a bridle-bit, the combination with cheek-pieces, comprising upwardly-disposed extensions, designed to be connected with the fore-check or overdraw, and oppositely-disposed extensions, a flexible, adjustable connection between said extensions, adapted to fit under the lower jaw of the animal, and rein attachments, arranged to permit only a direct pull on the mouth part; of a mouth part, secured to the cheek-pieces contiguous to the rein attachments, and so connected as to prevent any rotation of the mouth part, relatively to the cheek-pieces, substantially as described.

7. In a bridle-bit, the combination with cheek-pieces, comprising upwardly-disposed extensions or branches 8, provided with eyes 9, designed to be connected with the fore-check or overdraw, and oppositely-disposed extensions to the cheek-pieces, provided with eyes 6, the adjustable strap 7 running through said eyes, and designed to fit the under jaw of the animal, and rein-rings 5, arranged to permit only a direct pull on the mouthpiece; of a mouthpiece, having axial perforations 3, at its extremities to receive the cheek-pieces where they are formed with the rein-rings 5, substantially as described.

In testimony whereof I affix my signature in presence of two witnesses.

GEORGE W. LE COMPTE.

Witnesses:
E. W. GARDENER,
J. M. S. WARING.